May 1, 1928.

F. W. BECKER 1,633,359

WELDING AND CUTTING APPARATUS
Filed March 2, 1927.

INVENTOR
Frederick W. Becker
BY Serrell & Son
his ATTORNEYS

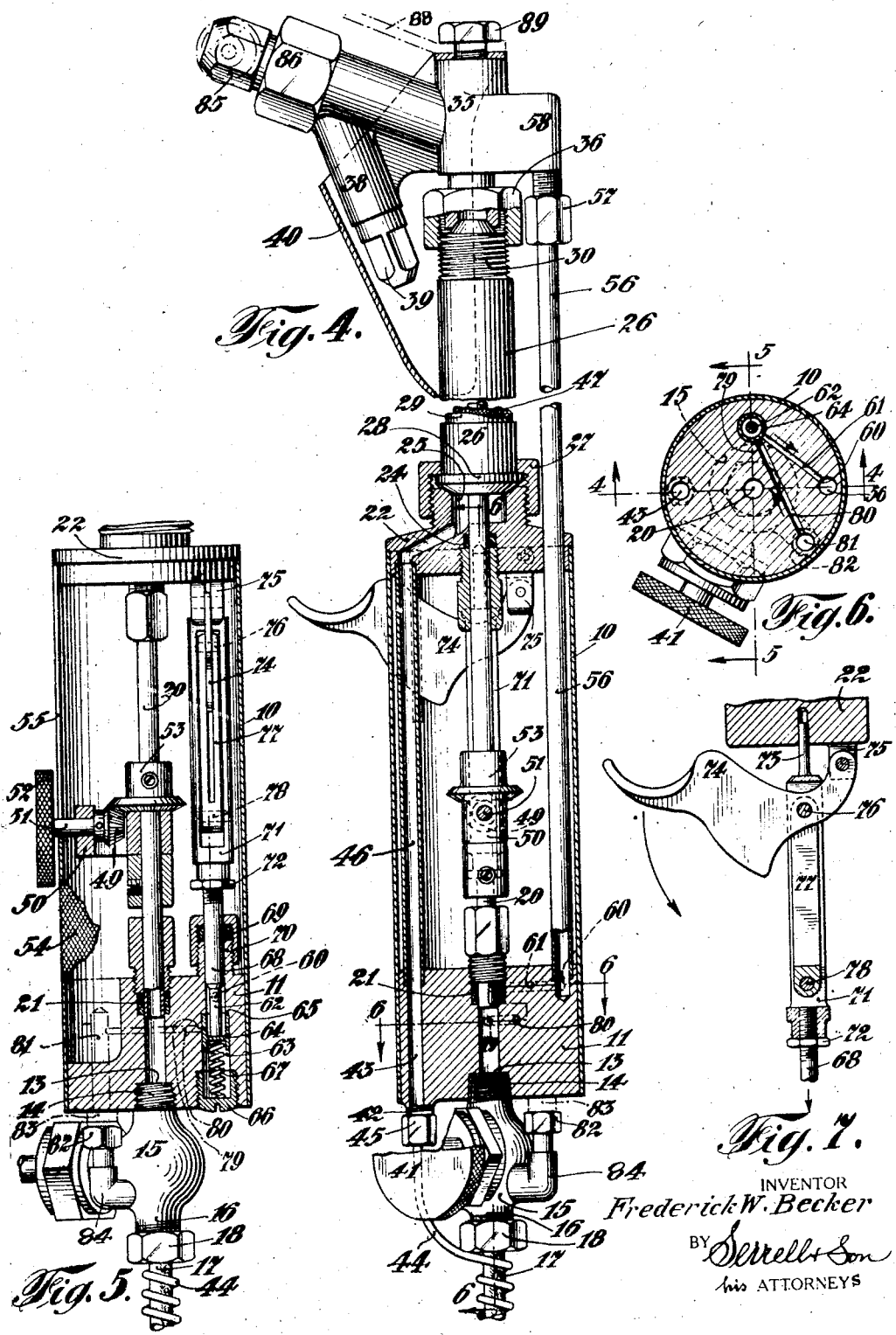

Patented June 21, 1927.

1,633,359

UNITED STATES PATENT OFFICE.

FREDERICK W. BECKER, OF EAST RUTHERFORD, NEW JERSEY.

WELDING AND CUTTING APPARATUS.

Application filed March 2, 1927. Serial No. 171,970.

My invention relates to apparatus for welding and cutting purposes, and its general working principle consists in feeding a mixture of oxygen and liquid fuel under pressure to a burner through specially constructed tubing in which the fuel automatically evaporates and in conjunction with the oxygen supplies a regulated flame which serves the desired purpose. The pressure is brought onto the liquid fuel by means of an air pump installed in the fuel container in the ordinary manner as with soldering lamps. In devices of this character it is important to control or regulate the flow of gases so as to obtain a proper mixture of the same according to the work to be performed, and a further object of my invention is to provide means for so doing and furthermore to effect economy of the gases by stopping their flow when the apparatus is not in use, and again giving passage to the gases when the apparatus is to resume work.

The details of the construction and operation of my improved apparatus are hereinafter particularly described.

In the accompanying drawings:—

Fig. 4 is a similar view to Fig. 1 showing the improved welding device provided with an attachment for cutting purposes.

Fig. 5 is a top view of the same partly in section, with the forward end broken off.

Fig. 6 is a section on the line 6—6 of Fig. 4, and

Fig. 7 is a detailed view of the trigger valve shown in Figs. 4 and 5.

Figure 1:
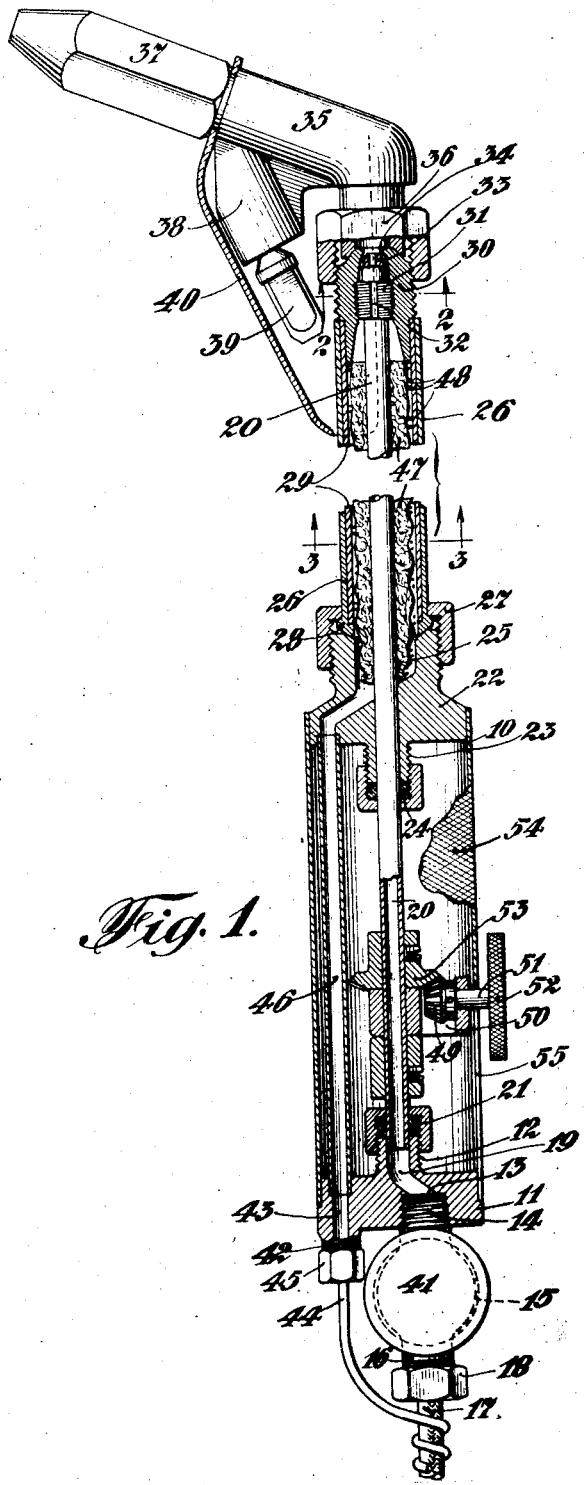
Figure 1 is a side view of a welding apparatus embodying my invention, partly in section and broken away in length.
Figure 2:
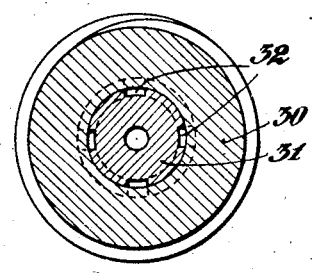
Fig. 2 is an enlarged cross section on the broken line 2—2 of Fig. 1.
Figure 3:
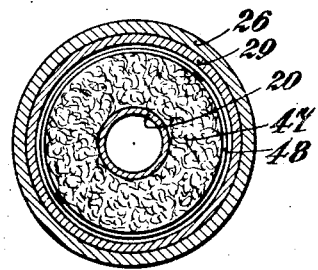
Fig. 3 is an enlarged cross section on the broken line 3—3 of Fig. 1.

Referring to the Figs. 1, 2 and 3 of the drawings, 10 indicates a cylindrical sleeve forming the handle of the instrument.

Into the rear end of the handle is fitted a block 11 having an exteriorly threaded nipple 12 projecting inwardly of the handle, and an interiorly threaded recess 13 in its outer side into which is screwed a plug 14 projecting from a valve chamber 15 there being a bore through the plug 14, block 11, and nipple 12 communicating with the valve chamber 15. Another exteriorly threaded nipple 16 extends from the opposite side of the valve chamber 15 being provided with a bore into which enters one end of a flexible tube 17 secured by a lock nut 18. This tube 17 extends to an oxygen tank (not shown).

One end of a tubular elbow 19 is fitted into the bore in the plug 14, and into the other end of this elbow one end of an oxygen tube 20 is slidably entered, there being a stuffing box 21 screwed upon the threaded plug 14, which prevents leakage of the oxygen at such connections.

A block 22 is fitted into the forward end of the handle 10 having an exteriorly threaded nipple 23 extending inwardly of the handle, there being a bore through this nipple and the block 22, through which the tube 20 extends, a stuffing box 24 being screwed over the nipple 23. That portion of the block 22 extending beyond the handle 10 is preferably somewhat reduced in diameter and exteriorly threaded having a recess 25. One end of a tube 26 is seated against the recessed end of the block 22 and is held in position by a nut 27 screwed over the threaded end of the block 22 and against the annular flange 28 on the tube 26.

Within the tube 26 and bearing against the same is another tube 29 extending the whole length of the tube 26.

Fitted within the forward end of the tube 29, is a valve casing 30, exteriorly threaded into which the forward end of the tube 20 extends. This casing 30 is also partly threaded interiorly, there being a threaded collar 31 fixed to the tube 20 engaging such interiorly threaded portion of the casing 30. This collar 31 is provided with spaced longitudinal slots 32 for the purpose hereafter described.

Upon the extreme forward end of the oxygen tube 20 is fixed a valve 33, which may be adjusted nearer to or further from its seat 34 to regulate the flow of gases by means hereafter described.

The burner head 35, is removably connected to the valve casing 30 by a nut 36. 37 indicates the flame nozzle, which is removably attached to the burner head, preferably by providing a threaded portion which is screwed into the lower end of the head 35, which is interiorly threaded at that point, whereby different nozzles may be readily attached to the head according to the work to be performed. The burner head 35 is provided with an integral upwardly inclined projection 38 having a central bore, to which is connected an auxiliary burner 39, which serves to assist evaporation of the liquid fuel. If desired, a shield 40 may be employed to protect the hands or clothing of the operator from contact with the auxiliary burner, which shield also serves to direct the heat from the auxiliary burner against the instrument. The shield may be clamped between the burner head 35 and the nozzle 37, as shown in Fig. 1.

The supply of oxygen to the tube 20 is regulated by the disk valve 41 within the valve chamber 15.

The outer end of the block 11 has a threaded hollow stem 42 into which one end of a fuel supply pipe 43 is inserted. A flexible tube 44 extends from a container (not shown) for the liquid fuel and connects with this end of the pipe 43 the connection being secured by a nut 45.

The fuel pipe 43 extends through a tube 46 within the handle 10 and its forward end is inclined upwardly and communicates with the recess 25 in the block 22.

Surrounding the oxygen tube 20 between the recessed end of the block 22 and the valve casing 30 is a packing 47 of asbestos material which is wound with a wire binder 48 so that there is a narrow space left between the packing 47 and the tube 29 for the passage of the liquid fuel which evaporates upon reaching that portion heated by the auxiliary burner 39, both gases mixing in the burner head 35.

A bevel gear 49 is supported within the sleeve 10 by a bracket 50 fixed to the oxygen tube 20 the stem 51 of the gear extending through an elongated slot 55 in the sleeve 10, and provided at its top with a head or thumb disk 52.

This beveled gear 49 meshes with another beveled gear 53 fixed to the tube 20 whereby the tube 20 can be moved backward or forward to open or close the valve 33 thus regulating the supply of liquid fuel to the burner head 35. The longitudinal slots 32 in the collar 31 permit the passage of the liquid fuel gas into the burner head 35. The outer surface of the sleeve or handle 10 may be knurled as at 54 if desired.

Whether the apparatus is being used for welding or cutting purposes, the operation continues as hereinbefore described, but for cutting use, a greater supply and pressure of oxygen is required, and for this purpose I provide an additional supply tube 56 for the oxygen gas, one end of which tube is connected with the burner head by a coupling nut 57, the burner head being in such case provided with an integral extension 58.

The tube 56 extends through an opening in the block 22 within the sleeve 10, its other end being received into a recess in the block 11 and provided with an opening 60 in register with a bore 61 in the block 11.

62 indicates a needle valve slidably arranged within an opening 63, in the block 11 and seated within a hollow sleeve 64, also slidable within said opening in the block 11 having movement between a shoulder 65, and a hollow plug 66 which is screwed into an enlarged threaded recess in the outer end of the block 11 there being a spiral spring 67 within the hollow plug 66 and the bottom of the sleeve 64. The stem 68 of the valve 62 passes through a stuffing box 69, screwed upon a nipple 70 extending from the block 11.

The end of the valve stem 68 is threaded and is connected to one end of a frame 71 by a nut 72. The other end of this frame 71 is provided with a pin 73, which enters an opening in the block 22, in which it is slidable.

The valve 62 is operated by a trigger 74, the upper end of which is pivotally connected to a lug 75, upon the block 22 below which it is pivoted at 76, to one end of a link 77, the other end of the link being pivoted at 78 to the frame 71. When the trigger 74 is drawn backward the needle valve 62 presses the sleeve 64 against the tension of the spring 67 against the inner end of the plug 66, which brings the opening 79 in the valve 62 into register with the bore 61. Upon releasing pressure upon the trigger 74, the expansion of the spring 67 returns the parts to a normal condition, shutting off communication with the bore 61.

80 denotes another bore within the block 11, one end of which is normally covered by the sleeve 64, and uncovered when the trigger valve is operated, allowing communication with the opening in the block 11, in which the sleeve slides. The other end of this bore 80 communicates with another bore 81 also within the block 11 which bore 81 is closed at its inner end, its open other end communicating with a short section of pipe 83, the other end of which pipe is connected by a nut 82 to an elbow 84 upon and communicating with the interior of the valve chamber 15.

It will thus be seen that when the trigger valve is operated, an additional supply and pressure of oxygen gas will be forced into the burner head 35 through the elbow 84, pipe 83 and bores 81, 80, 61, and tube 56.

The cutting nozzle 85 shown in Fig. 4 may be attached to the burner head 35, in the same manner as is the nozzle 37 shown in Fig. 1 but I prefer to attach the nozzle 85 to the burner head by means of a coupling nut 86, as shown in Fig. 4.

If desired, although it forms no part of my invention, a spacing roller may be employed, supported by an arm 88, secured to the burner head by a nut 89.

My improved apparatus is equally well adapted for welding or cutting purposes; it is of strong construction and easily handled.

The flow of gases is regulated in such manner that a proper mixture is obtained according to the work to be performed, with economy of the gases.

I claim as my invention:

1. A welding apparatus of the character described, comprising a burner head, a burner nozzle detachably secured to one end of said head, a valve casing, means for detachably connecting the same to the burner head, a valve within said casing, an oxygen supply tube, means for securing said valve to one end of said tube, a hollow handle, a block within one end of the handle provided with an opening through which said tube slidably extends and recessed at one end, another tube of larger diameter surrounding said oxygen tube between said valve casing and the recessed end of said block, another block within the other end of the handle, a tubular elbow within an opening in said block, a valve chamber exterior of said handle with which said elbow communicates, a valve in said chamber, tubes extending from said valve chamber for connection with a source of oxygen supply, the other end of said oxygen tube slidably entering said elbow, means for moving the said oxygen supply tube to seat or unseat the valve at its forward end, a liquid fuel tube extending through said blocks in the handle with one open end communicating with the recess in the end of said first block and the interior of the tube surrounding the oxygen tube, and means attached to the other end of said fuel tube for connection with a source of fuel supply.

2. A welding apparatus of the character described, comprising a burner head, a burner nozzle detachably connected to one end of the same, a valve casing, means for detachably connecting the same to the other end of the burner head, a valve within said casing, an oxygen supply tube, means for securing said valve to one end of said tube, a hollow handle, a block within one end of said handle provided with an opening through which said tube slidably extends, another tube of larger diameter surrounding said oxygen supply tube with one end supported on said valve casing and provided with an annular flange at its other end, means for detachably securing its flanged end to said block, another tube within said larger tube in contact therewith, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering said elbow, means for moving said oxygen tube backward and forward to operate said valve at its forward end, a liquid fuel tube extending through said blocks in the handle with one end communicating with the interior of the inner tube surrounding the oxygen tube, and tubular means attached to its other end for connection with a source of fuel supply.

3. A welding apparatus of the character described, comprising a burner head, a burner nozzle detachably secured to one end of said head, a valve casing, means for detachably connecting the same to the burner head, a valve within said casing, an oxygen supply tube, a threaded collar provided with spaced longitudinal slots connecting said valve to one end of said tube, a hollow handle, a block within one end of the handle provided with an opening through which said tube slidably extends and recessed at one end, another tube of larger diameter surrounding said oxygen tube with one end supported on said valve casing and provided with an annular flange at its other end, means for detachably securing its flanged end to said block, another tube within said larger tube in contact therewith, an asbestus packing surrounding the oxygen tube within said inner tube, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering the said elbow, a beveled gear secured to said oxygen tube within said handle, another beveled gear meshing therewith, a bracket attached to the oxygen tube and supporting said second gear, said second gear being provided with a shank extending through an elongated slot in the handle and provided with a head at its outer end by means of which said oxygen tube may be moved to seat or unseat the valve at its forward end, a liquid fuel tube extending through said blocks in the handle with one end communicating with the recess in the end of said first block, and means attached to the other end of said first block for connection with a source of liquid fuel supply.

4. A welding apparatus of the character described, comprising a burner head, a burner nozzle detachably secured to one end of said head, a valve casing, means for detachably connecting the same to the burner head, a valve within said casing, an oxygen supply tube, means for securing said valve to one end of said tube, a hollow handle, a block within one end of the handle provided with an opening through which said tube slidably extends and recessed at one end, another tube of larger diameter surrounding said oxygen tube between said valve casing and the recessed end of said block, another block within the other end of the handle, a tubular elbow within an opening in said block, a valve chamber exterior of said handle with which said elbow communicates, a valve in said chamber, tubes extending from said valve chamber for connection with a source of oxygen supply, the other end of said oxygen tube slidably entering said elbow, means for moving the said oxygen supply tube to seat or unseat the valve at its forward end, a liquid fuel tube extending through said blocks in the handle with one open end communicating with the recess in the end of said first block and the interior of the tube surrounding the oxygen tube, means attached to the other end of said fuel tube for connection with a source of fuel supply, tubular connections between the burner head and the valve chamber for admitting an additional supply of oxygen gas to the burner head, and a valve for controlling such additional supply.

5. A welding apparatus of the character described, comprising a burner head, a burner nozzle detachably connected to one end of the same, a valve casing, means for detachably connecting the same to the other end of the burner head, a valve within said casing, an oxygen supply tube, means for securing said valve to one end of said tube, a hollow handle, a block within one end of said handle provided with an opening through which said tube slidably extends, another tube of larger diameter surrounding said oxygen supply tube with one end supported on said valve casing and provided with an annular flange at its other end, means for detachably securing its flanged end to said block, another tube within said larger tube in contact therewith, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering said elbow, means for moving said oxygen tube backward and forward to operate said valve at its forward end, a liquid fuel tube extending through said blocks in the handle with one end communicating with the interior of the inner tube surrounding the oxygen tube, tubular means attached to its other end for connection with a source of fuel supply, tubular connections between the burner head and the valve chamber for admitting an additional supply of oxygen gas to the burner head, and a valve for controlling such additional supply.

6. A welding apparatus of the character described, comprising a burner head, a burner nozzle detachably secured to one end of said head, a valve casing, means for detachably connecting the same to the burner head, a valve within said casing, an oxygen supply tube, a threaded collar provided with spaced longitudinal slots connecting said valve to one end of said tube, a hollow handle, a block within one end of the handle provided with an opening through which said tube slidably extends and recessed at one end, another tube of larger diameter surrounding said oxygen tube with one end supported on said valve casing and provided with an annular flange at its other end, means for detachably securing its flanged end to said block, another tube within said larger tube in contact therewith, an asbestus packing surrounding the oxygen tube within said inner tube, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering the said elbow, a beveled gear secured to said oxygen tube, another beveled gear within said handle, another beveled gear meshing therewith, a bracket attached to the oxygen tube and supporting said second gear, said second gear being provided with a shank extending through an elongated slot in the handle and provided with a head at its outer end by means of which said oxygen tube may be moved to seat or unseat the valve at its forward end, a liquid fuel tube extending through said blocks in the handle with one end communicating with the recess in the end of said first block, means attached to the other end of said fuel tube for connection with a source of liquid fuel supply, tubular connections between the burner head and the valve chamber for admitting an additional supply of oxygen gas to the burner head, and a valve for controlling such additional supply.

7. A welding apparatus of the character described, comprising a burner head, a burner nozzle detachably secured to one end of said head, a valve casing, means for detachably connecting the same to the burner head, a valve within said casing, an oxygen supply tube, means for securing said valve to one end of said tube, a hollow handle, a block within one end of the handle provided with an opening through which said tube slidably extends and recessed at one end, another tube of larger diameter surrounding said oxygen tube between said valve casing and the recessed end of said block, another block within the other end of the handle, a tubular elbow within an opening in said block, a valve chamber exterior of said handle with which said elbow communicates, a valve in said chamber, tubes extending from said valve chamber for connection with a source of oxygen supply, the other end of said oxygen tube slidably entering said elbow, means for moving the said oxygen supply tube to seat or unseat the valve at its forward end, a liquid fuel tube extending through said blocks in the handle with one open end communicating with the recess in the end of said first block and the interior of the tube surrounding the oxygen tube, means attached to the other end of said fuel tube for connection with a source of fuel supply, a second oxygen tube detachably connected at one end to the burner head with its other end supported in a recess in the block at the outer end of the handle, tubular passageways leading from said recess to and communicating with the valve chamber, there being an opening in said second oxygen tube adjacent its end within said recess registering with said passageways whereby an additional supply of oxygen may be admitted to the burner head, and a valve for opening and shutting off communication between said second oxygen tube and said passageways.

8. A welding apparatus of the character described, comprising a burner head, a burner nozzle detachably connected to one end of the same, a valve casing, means for detachably connecting the same to the other end of the burner head, a valve within said casing, an oxygen supply tube, means for securing said valve to one end of said tube, a hollow handle, a block within one end of said handle provided with an opening through which said tube slidably extends, another tube of larger diameter surrounding said oxygen supply tube with one end supported on said valve casing and provided with an annular flange at its other end, means for detachably securing its flanged end to said block, another tube within said larger tube in contact therewith, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering said elbow, means for moving said oxygen tube backward and forward to operate said valve at its forward end, a liquid fuel tube extending through said blocks in the handle with one end communicating with the interior of the inner tube surrounding the oxygen tube, tubular means attached to its other end for connection with a source of fuel supply, a second oxygen tube detachably connected at one end to the burner head with its other end supported in a recess in the block at the outer end of the handle, tubular passageways leading from said recess to and communicating with the valve chamber, there being an opening in said second oxygen tube adjacent its end within said recess registering with said passageways whereby an additional supply of oxygen may be admitted to the burner head, and a valve for opening and shutting off communication between said second oxygen tube and said passageways.

9. A welding apparatus of the character described, comprising a burner head, a burner nozzle detachably secured to one end of said head, a valve casing, means for detachably connecting the same to the burner head, a valve within said casing, an oxygen supply tube, a threaded collar provided with spaced longitudinal slots connecting said valve to one end of said tube, a hollow handle a block within one end of the handle provided with an opening through which said tube slidably extends and recessed at one end, another tube of larger diameter surrounding said oxygen tube with one end supported on said valve casing and provided with an annular flange at its other end, means for detachably securing its flanged end to said block, another tube within said larger tube in contact therewith, an asbestus packing surrounding the oxygen tube within said inner tube, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering the said elbow, a beveled gear secured to said oxygen tube within said handle, another beveled gear meshing therewith, a bracket attached to the oxygen tube and supporting said second gear, said second gear being provided with a shank extending through an elongated slot in the handle and provided with a head at its outer end by means of which said oxygen tube may be moved to seat or unseat the valve at its forward end, a liquid fuel tube extending through said blocks in the handle with one end communicating with the recess in the end of said first block, means attached to the other end of said fuel tube for connection with a source of liquid fuel supply, a second oxygen tube detachably connected at one end to the burner head with its other end supported in a recess in the block at the outer end of the handle, tubular passageways leading from said recess to and communicating with the valve chamber, there being an opening in said second oxygen tube adjacent its end within said recess registering with said passageways whereby an additional supply of oxygen may be admitted to the burner head, and a valve for opening and shutting off communication between said second oxygen tube and said passageways.

10. A welding apparatus of the character described, comprising a burner head, a burner nozzle detachably secured to one end of said head, a valve casing, means for detachably connecting the same to the burner head, a valve within said casing, an oxygen supply tube, means for securing said valve to one end of said tube, a hollow handle, a block within one end of the handle provided with an opening through which said tube slidably extends and recessed at one end, another tube of larger diameter surrounding said oxygen tube between said valve casing and the recessed end of said block, another block within the other end of the handle, a tubular elbow within an opening in said block, a valve chamber exterior of said handle with which said elbow communicates, a valve in said chamber, tubes extending from said valve chamber for connection with a source of oxygen supply, the other end of said oxygen tube slidably entering said elbow, means for moving the said oxygen supply tube to seat or unseat the valve at its forward end, a liquid fuel tube extending through said blocks in the handle with one open end communicating with the recess in the end of said first block and the interior of the tube surrounding the oxygen tube, means attached to the other end of said fuel tube for connection with a source of fuel supply, another oxygen supply tube, means for detachably securing one end thereof to the burner head, said tube extending through an opening in the block in the forward end of the handle, its other end being fitted into a recess in the block in the other end of the handle and provided with an opening in register with a bore in said block, said block being also provided with other bores communicating with said first bore, tubular connections between the open end of one of said bores and said valve chamber, a needle valve slidably supported in an opening in said block, a slidable sleeve forming a seat for said valve, a spiral spring in contact with said sleeve, said needle valve being provided with an opening, a trigger, and connected means by which said opening is brought into register with the open end of said first bore against the tension of said spring, thereby establishing communication between the burner head and valve chamber for the admission of an additional supply of oxygen gas to the burner head.

11. A welding apparatus of the character described, comprising a burner head, a burner nozzle detachably connected to one end of the same, a valve casing, means for detachably connecting the same to the other end of the burner head, a valve within said casing, an oxygen supply tube, means for securing said valve to one end of said tube, a hollow handle, a block within one end of said handle provided with an opening through which said tube slidably extends, another tube of larger diameter surrounding said oxygen supply tube with one end supported on said valve casing and provided with an annular flange at its other end, means for detachably securing its flanged end to said block, another tube within said larger tube in contact therewith, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering said elbow, means for moving said oxygen tube backward and forward to operate said valve at its forward end, a liquid fuel tube extending through said blocks in the handle with one end communicating with the interior of the inner tube surrounding the oxygen tube, tubular means attached to its other end for connection with a source of fuel supply, another oxygen supply tube, means for detachably securing one end thereof to the burner head, said tube extending through an opening in the block in the forward end of the handle, its other end being fitted into a recess in the block in the other end of the handle and provided with an opening in register with a bore in said block, said block being also provided with other bores communicating with said first bore, tubular connections between the open end of one of said bores and said valve chamber, a needle valve slidably supported in an opening in said block, a slidable sleeve forming a seat for said valve, a spiral spring in contact with said sleeve, said needle valve being provided with an opening, a trigger, and connected means by which said opening is brought into register with the open end of said first bore against the tension of said spring, thereby establishing communication between the burner head and valve chamber for the admission of an additional supply of oxygen gas to the burner head.

12. A welding apparatus of the character described, comprising a burner head, a burner nozzle detachably secured to one end of said head, a valve casing, means for detachably connecting the same to the burner head, a valve within said casing, an oxygen supply tube, a threaded collar provided with spaced longitudinal slots connecting said valve to one end of said tube, a hollow handle, a block within one end of the handle provided with an opening through which said tube slidably extends and recessed at one end, another tube of larger diameter surrounding said oxygen tube with one end supported on said valve casing and provided with an annular flange at its other end, means for detachably securing its flanged end to said block, another tube within said larger tube in contact therewith, an asbestos packing surrounding the oxygen tube within said inner tube, another block in the other end of said handle, a tubular elbow within an opening in said second block, a valve chamber exterior of said handle with which said elbow communicates, a valve within the valve chamber, means extending from said valve chamber for connection with a source of oxygen supply, the other end of said oxygen tube slidably entering the said elbow, a beveled gear secured to said oxygen tube within said handle, another beveled gear meshing therewith, a bracket attached to the oxygen tube and supporting said second gear, said second gear being provided with a shank extending through an elongated slot in the handle and provided with a head at its outer end by means of which said oxygen tube may be moved to seat or unseat the valve at its forward end, a liquid fuel tube extending through said blocks in the handle with one end communicating with the recess in the end of said first block, means attached to the other end of said fuel tube for connection with a source of liquid fuel supply, another oxygen supply tube, means for detachably securing one end thereof to the burner head, said tube extending through an opening in the block in the forward end of the handle, its other end being fitted into a recess in the block in the other end of the handle and provided with an opening in register with a bore in said block, said block being also provided with other bores communicating with said first bore, tubular connections between the open end of one of said bores and said valve chamber, a needle valve slidably supported in an opening in said block, a slidable sleeve forming a seat for said valve, a spiral spring in contact with said sleeve, said needle valve being provided with an opening, a trigger, and connected means by which said opening is brought into register with the open end of said first bore against the tension of said spring, thereby establishing communication between the burner head and valve chamber for the admission of an additional supply of oxygen gas to the burner head.

Signed by me this 15th of February, 1927.

FREDERICK W. BECKER.